United States Patent
Muehlhoff et al.

(10) Patent No.: US 6,773,113 B2
(45) Date of Patent: Aug. 10, 2004

(54) PROJECTION ARRANGEMENT FOR PROJECTING AN IMAGE ONTO A PROJECTION SURFACE

(75) Inventors: Dirk Muehlhoff, Jena (DE); Klaus Knupfer, Essingen (DE); Oliver Baumann, Aalen (DE); Bernd Spruck, Moegglingen (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 10/149,954

(22) PCT Filed: Aug. 24, 2001

(86) PCT No.: PCT/EP01/09807
§ 371 (c)(1),
(2), (4) Date: Jun. 17, 2002

(87) PCT Pub. No.: WO02/17017
PCT Pub. Date: Feb. 28, 2002

(65) Prior Publication Data
US 2003/0112413 A1 Jun. 19, 2003

(30) Foreign Application Priority Data
Aug. 25, 2000 (DE) .......................... 101 41 896

(51) Int. Cl.[7] .................. G03B 31/00; G03B 21/00; G03B 21/26; G03B 21/14; G03B 19/18
(52) U.S. Cl. ................. 353/35; 353/15; 353/31; 353/34; 353/37; 353/48; 353/51; 353/68; 353/82; 352/136
(58) Field of Search .................. 353/15, 31, 34–35, 353/37, 48–51, 68, 82, 98, 122; 352/136

(56) References Cited
U.S. PATENT DOCUMENTS
5,772,301 A * 6/1998 Kwon et al. ............... 353/122
5,806,950 A * 9/1998 Gale et al.
5,851,060 A * 12/1998 Uchiyama et al. ............ 353/94
6,471,355 B1 * 10/2002 Monson et al. ............... 353/30

FOREIGN PATENT DOCUMENTS
| DE | 196 42 617 A1 | 3/1998 | |
| DE | 198 24 917 A1 | 12/1999 | |
| EP | 0 961 502 A2 | 12/1999 | |
| JP | 52007726 A * | 1/1977 | ........... G03B/17/00 |
| WO | WO 97/26569 A2 | 7/1997 | |

OTHER PUBLICATIONS

International Search Report.

* cited by examiner

*Primary Examiner*—Russell Adams
*Assistant Examiner*—Magda Cruz
(74) *Attorney, Agent, or Firm*—Patterson, Thuente, Skaar & Christensen, P.A.

(57) ABSTRACT

In a projection arrangement for projecting an image onto a projection surface, there are provided a light source (26), a control unit (25), a light modulator (10), which is controllable by said control unit (25) in order to generate an image on the basis of predetermined image data, an optical device (11), arranged following said light modulator, for projecting said image onto the projection surface (34), a film stage (2) for holding a positive image recorded on a carrier medium, projection optics (3), arranged following the film stage (2) when projecting the positive image, and a control device (6), allowing either to direct light from the light source (26) to the light modulator (10) or to illuminate a positive image, which is held by the film stage (2), with said light. Thus, a projection arrangement is provided which can project both positive images and images generated on the basis of predetermined data onto a projection surface (34).

19 Claims, 8 Drawing Sheets

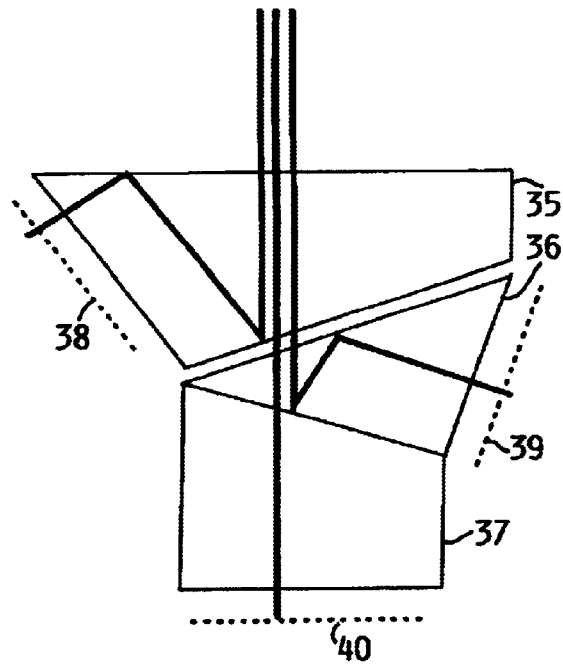
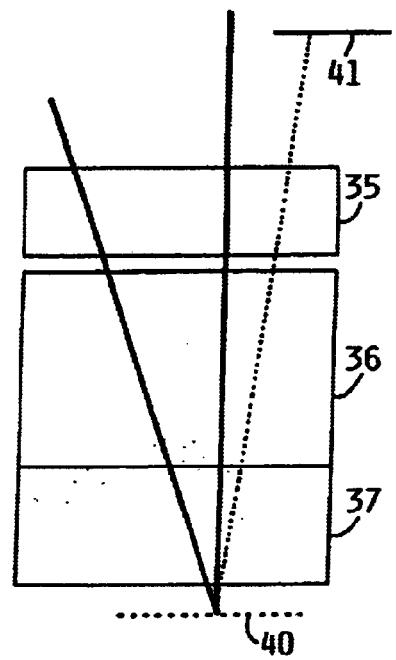
FIG. 4　　　　　　　　FIG. 5
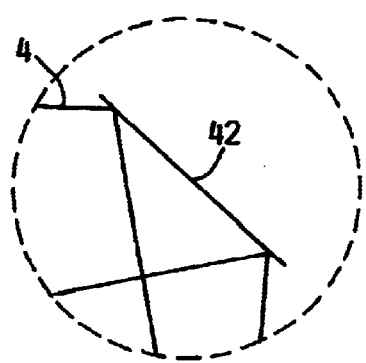
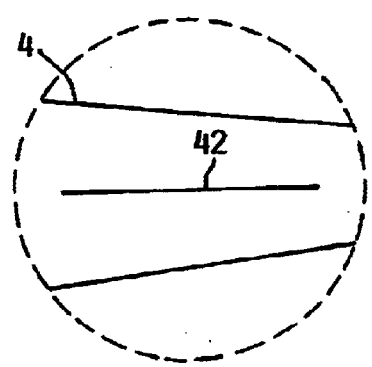
FIG. 6　　　　　　　　FIG. 7

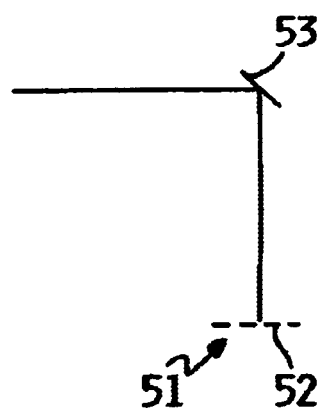
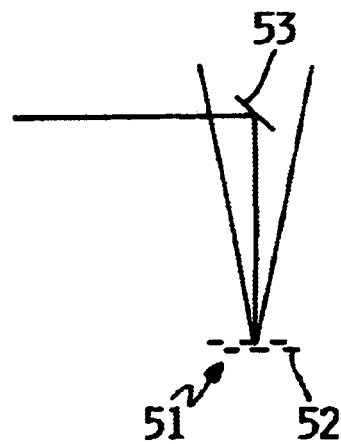
FIG. 12  FIG. 13
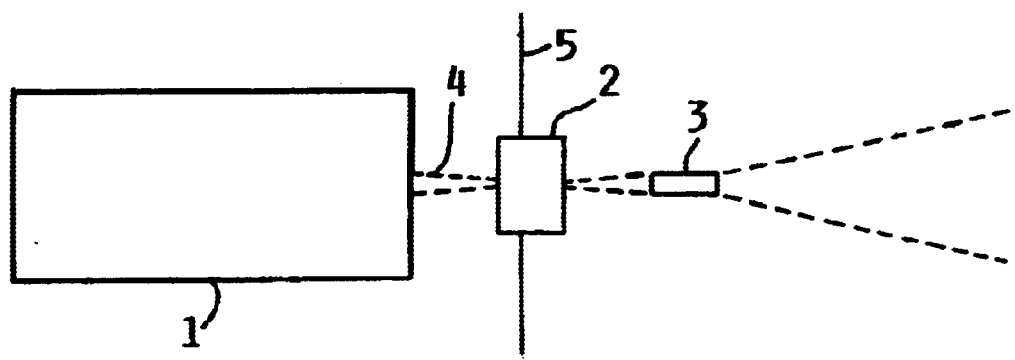
FIG. 14 (PRIOR ART)

PROJECTION ARRANGEMENT FOR PROJECTING AN IMAGE ONTO A PROJECTION SURFACE

The invention relates to a projection arrangement for projecting an image onto a projection surface.

Such a projection arrangement is, for example, a projector for projecting a motion picture, which comprises a light source, a mechanical film stage and a projection lens. The light source emits a light ray bundle which illuminates positive images on a film guided transversely to the light propagation direction of the light ray bundle. The illuminated positive images are projected onto a screen by the projection lens. During operation, the film is unwound from a film reel or a film disk on one side of the film stage, guided across said film stage, and wound up on the other side of the film stage on another film reel or another film disk. The film is guided discontinuously across the film stage such that the film is moved past a picture gate on the film stage and stopped, 24 times per second, each individual image being illuminated twice. At the same time, the control signals for the theater sound system are also sampled. Such projector only allows conventional movies to be projected. A projection of movies, which are present only as digital and/or analog data and for the projection of which the images to be projected have to be generated first on the basis of said data, is not possible.

However, such movies have a number of advantages over conventional movies. Thus, it is possible to distribute such movies faster and more easily than conventional movies, because either a data carrier (e.g. a DVD), on which the data are recorded, may be shipped or the data may be transmitted directly via data lines, and it is no longer necessary to ship heavy film reels. Further, the quality of image and sound remains unchanged even after frequent screenings, while the quality of conventional movies may deteriorate with each screening. For the projection of such movies, which are present only as data, there are projection devices which comprise light modulators for imaging, said light modulators allowing to generate the image according to said image data. As light modulators, for example, LCD modules or tilting mirror matrices (DMD chips) are used. If the projector for projecting conventional movies is replaced by such projection arrangement, this will result in a high cost of acquisition, since an entire projection arrangement needs to be acquired. Further, such projection arrangement will no longer allow conventional movies to be screened.

EP 0,961,502 A2 describes a movie projector for projecting digital movies. This movie projector consists of the light source of a conventional movie projector for projecting conventional movies and of a digital front module, which is fixed to the housing of the light source instead of the film stage. This allows to convert a conventional movie projector to a digital projector and to save costs, because the light source of the conventional projector can be used for said digital projector. However, said digital projector still has the disadvantage that it is no longer possible to project a conventional movie. Also, said conversion is labor-extensive, because the film stage needs to be dismounted completely.

Now, the invention is intended to remedy this and to improve the aforementioned projection arrangement such that the projection arrangement is suitable for the projection of both a positive image recorded on a carrier medium and of an image to be generated on the basis of predetermined image data. Moreover, a supplementary module for use with such projection arrangement is to be proposed.

According to the invention, this problem is solved by a projection arrangement for projecting an image onto a projection surface, said arrangement comprising a light source, a control unit, a light modulator, which is controllable by said control unit in order to generate an image on the basis of digital and/or analog image data, an optical device, arranged following said light modulator, for projecting said image onto the projection surface, a film stage for holding a positive image recorded on a carrier medium, projection optics, arranged following the film stage during projection, and a control device, allowing either to direct light from the light source to the light modulator or to illuminate a positive image, which is held by the film stage, with said light.

In an advantageous embodiment of the projection arrangement according to the invention, the control device comprises an optical deflecting element (e.g. a mirror), which may direct the light from the light source to the light modulator. Said optical deflecting element may be moved back and forth between a first position, in which it is arranged in the optical path of the light emitted by the light source, between the light source and the projection optics, and in which it deflects said light, and a second position, in which it is not arranged in said optical path and, consequently, does not deflect the light to the light modulator. Preferably, said optical deflecting element is disposed between the light source and the film stage. Thus, there is no need to dismount the film stage and, at the same time, a compact configuration of the projection arrangement according to the invention may be realized as well.

Preferably, the projection arrangement according to the invention may be further embodied such that the light modulator is movable into an optical path extending from the light source via the film stage to the projection surface. Thus, the optical path of the projection arrangement remains unchanged, so that a simple construction of the projection arrangement may be realized.

The projection arrangement according to the invention may be further embodied such that the control device comprises an optical path switch arranged in the optical path between the light source and the projection optics, or arranged following the film stage. Preferably, said optical path switch may be an electronically switchable element, so that no mechanical movement of components is required for switching the optical path.

The light modulator, the optical device and the control device are preferably provided as an attachable module. On the one hand, this allows the use, as the light source for the light modulator, of the light source of a conventional projector for projecting positive images. On the other hand, the mechanical film stage and the associated projection optics of the conventional projector can remain as they are, so that conventional movies may continue to be projected. Further, the conversion of an already existing, conventional projector to the projection arrangement according to the invention is easily possible, since, due to the control device, the mechanical film stage of the conventional projector need not be dismounted.

Preferably, the projection arrangement according to the invention may be further embodied such that the control device comprises a device by which the light source is movable from a first position, in which the light is incident on the light modulator, to a second position, in which the light is incident on the film stage. Alternatively, the control device may comprise a device by which the light modulator is movable together with the film stage from a first position, in which the light is incident on the light modulator, to a second position, in which the light is incident on the film stage. Said device of the control device ensures that the images generated on the basis of the predetermined image data, or conventional positive images, may be projected.

Particularly advantageously, the projection arrangement according to the invention may be further embodied such that a splitting device is provided, which splits the light from the light source into different color components, and that the light modulator comprises several light-modulating units, each of which modulates one of said color components. This configuration allows to obtain light outputs which meet the brightness requirements of movie theaters.

In a further advantageous embodiment of the projection arrangement according to the invention, combining optics are provided which combine the light emitted by light-modulating units to form one single light bundle and guide it to the optical device. This advantageously allows the modulated light of different colors to be imaged onto the screen by means of an optical device.

Preferably, the projection arrangement according to the invention is further embodied such that the light modulator comprises an LCD module—which may be in the form of a transmission or reflection module—a GLV module, or a tilting mirror matrix. Thus, a high-quality image may be generated.

In a further advantageous embodiment, the projection optics and the optical device of the projection arrangement according to the invention are comprised in one single projection device. Thus, it is possible to provide a projection arrangement requiring only one projection device, which allows to save costs.

The projection arrangement according to the invention may advantageously be further embodied such that a memory for storing data is provided. Said memory may be a digital memory, e.g. a computer hard disk, or may also be an analog memory, such as a conventional video tape. By providing such memory, the entire movie may be stored in the projection arrangement, so that there is no need for high transmission capacities of a connection with an external movie memory.

In another advantageous embodiment of the invention, the projection arrangement according to the invention comprises an interface for receiving data. Said interface may be, for example, a DVD drive. It may also be an interface for a computer network, such as the internet. This allows new movies to be transmitted to the projection arrangement as fast as possible and to be projected after or even during transmission.

In a further advantageous embodiment of the invention, a display device and an image recording device are provided, said image recording device being able to record the image projected onto the projection surface and to represent it on the display device. When the image recording device records the film projected onto the projection surface and reproduces it on the display device, it is possible to control the performance from outside the auditorium. Thus, for example, failure of the projection lamp or of the auditorium lighting may be diagnosed at once.

Further, the projection arrangement according to the invention may comprise several projection units, each comprising a light source; a film stage, arranged following said light source, for holding a positive image recorded on a carrier medium; projection optics, arranged following the film stage when projecting the positive image; and a first coupling member; said projection arrangement further comprising a control unit; a supplementary module comprising a light modulator which is controllable by the control unit in order to generate an image on the basis of predetermined image data; an optical device, arranged following the light modulator, for projecting said image onto the projection surface; and a second coupling member, wherein the supplementary module may be coupled to the projection units via said coupling members, and wherein said supplementary module further comprises a control device, allowing either to direct light from the light source of that projection unit to which the supplementary module is coupled, to the light modulator or to illuminate a positive image, which is held by the film stage of said projection unit, with said light. This projection arrangement advantageously allows to provide only one supplementary module for several projection units and to couple said supplementary module to the corresponding projection unit, as required.

The supplementary module according to the invention for use in a projection arrangement as described above comprises a control unit, a light modulator, which is controllable by said control device in order to generate an image on the basis of predetermined image data, an optical device, arranged following the light modulator, for projecting said image onto a projection surface, and a control unit, which device, when the supplementary module is in a condition coupled to a projector comprising a light source and a film stage, arranged following said light source, for holding a positive image recorded on a carrier medium, allows either to direct light from the light source to the light modulator or to illuminate a positive image, which is held by the film stage, with said light. This supplementary module allows easy and fast retrofit of a conventional projector, so that it may project either a positive image recorded on a carrier medium or an image generated on the basis of predetermined image data, as required.

A more detailed description of the invention, compared with a prior art example, shall be given below basically by way of example and in view of the drawings, wherein:

FIG. 4 shows a top view of the light modulator according to a further embodiment;

FIG. 5 shows a side view of the light modulator shown in FIG. 4;

FIGS. 6 and 7 show schematic views explaining an alternative embodiment of the deflecting unit;

FIGS. 12 and 13 show schematic views explaining an alternative embodiment of a light modulator; and FIG. 14 shows a schematic top view of a conventional movie projector.

Figure 15:
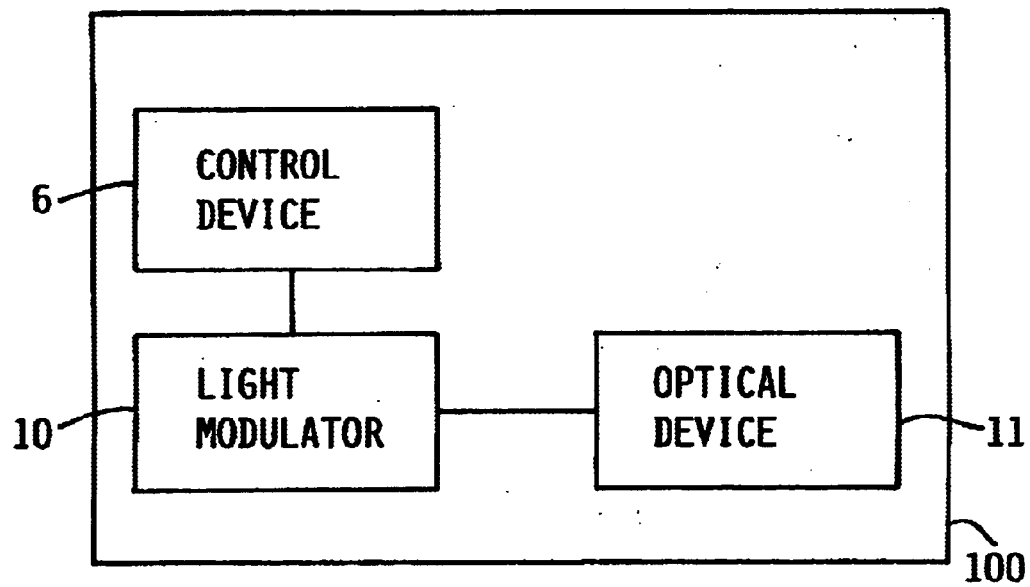

FIG. 15 schematically depicts an attachable module in accordance with the present invention.

Figure 16:
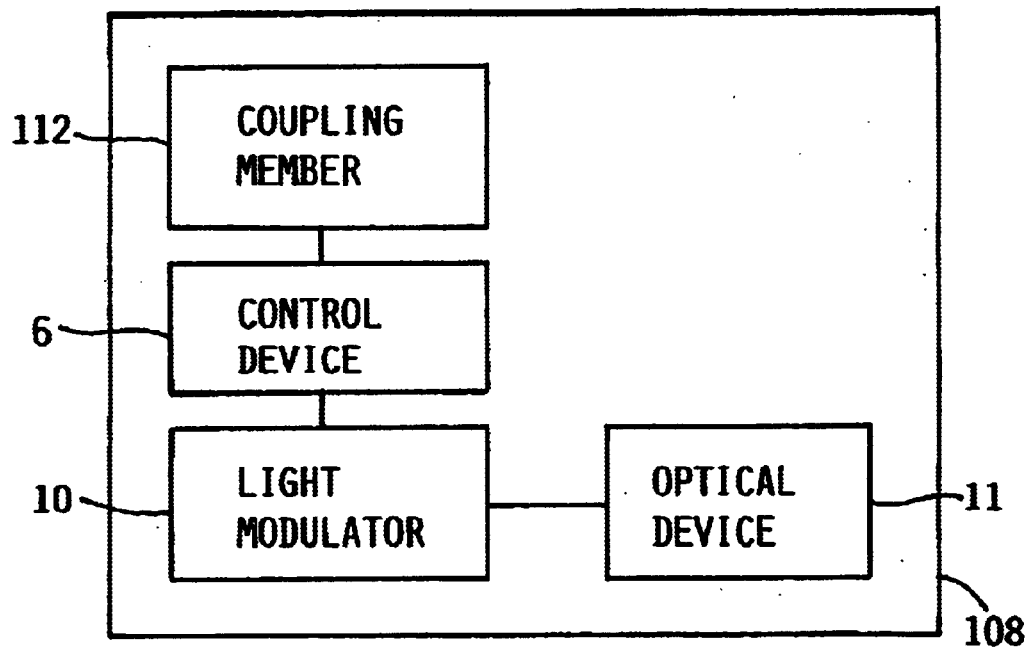

FIG. 16 schematically depicts a supplementary module in accordance with the present invention.

Figure 17:
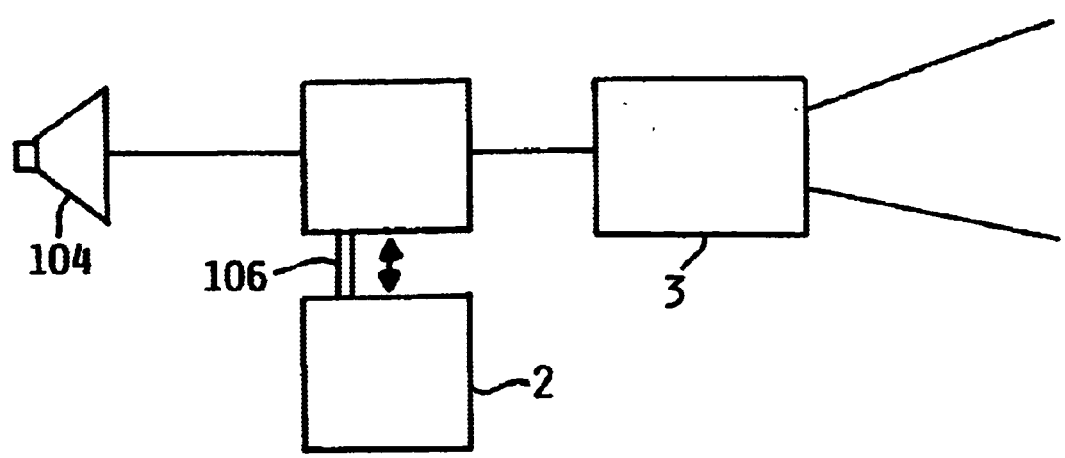

FIG. 17 schematically depicts a moving device for moving the film stage and image modulator simultaneously.

Figure 18:
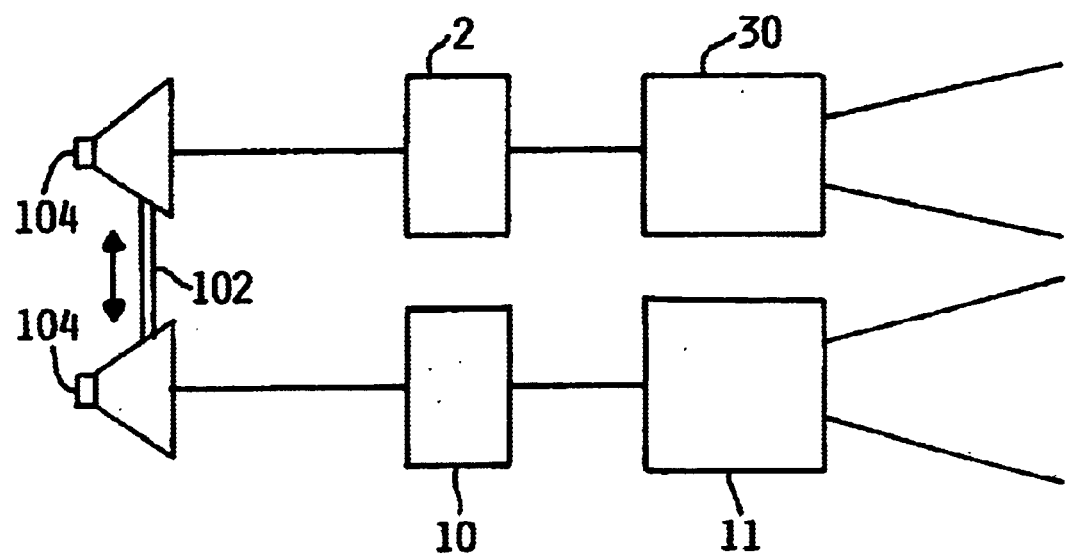
Figure 19:
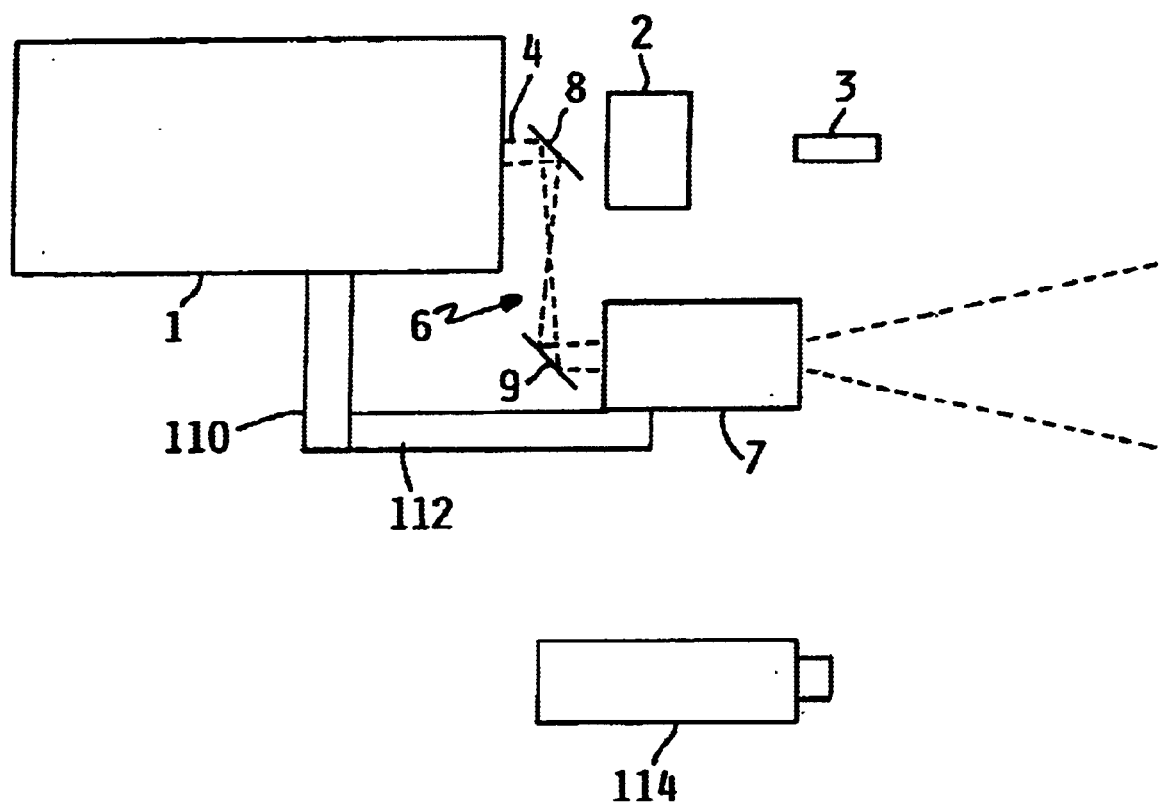

FIG. 18 schematically depicts a moving device for moving a light source in accordance with the present invention; and FIG. 19 schematically depicts an additional embodiment of the present invention.

For a better understanding of the projection arrangement according to the invention, a brief description shall be given, with reference to FIG. 14, of the basic structure of a conventional projector for projecting positive images or positive films. Such conventional projector contains a lamp housing 1, a mechanical film stage 2 and a projection lens 3. In the lamp housing 1, a light source (not shown) is arranged, which emits a light ray bundle 4 transilluminating a positive image on a film 5 held on the mechanical film stage 2, which film is guided transversely to the light propagation direction of the light ray bundle 4. The illuminated positive image is projected onto a projection surface (not shown) by means of the projection lens 3.

Figure 1:
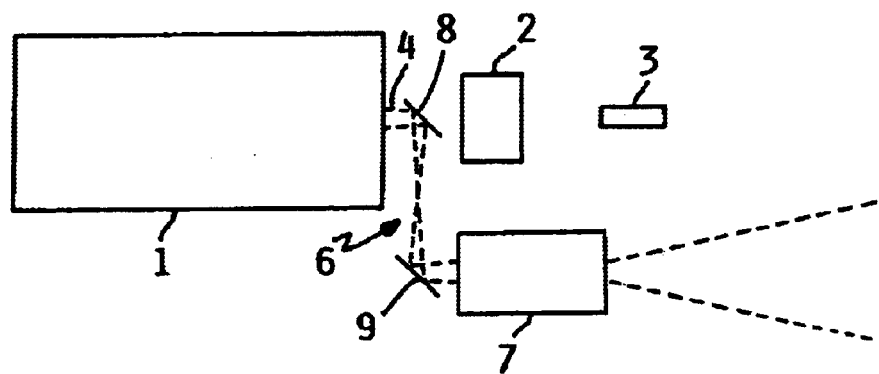
FIG. 1 shows a schematic top view of a projection arrangement according to the invention.

FIG. 1 shows a schematic top view of the projection arrangement according to the invention. Like the conventional projector shown in FIG. 14, the projection arrangement comprises a lamp housing 1, wherein a light source (e.g. a xenon lamp), not shown, is arranged, a mechanical film stage 2 and a projection lens 3. In addition, the projection arrangement according to the invention includes a deflecting unit 6 and an image generating module 7. The deflecting unit 6 comprises a first deflecting mirror 8, which is mounted on a carriage, not shown, which is movable perpendicular to the light propagation direction of the light ray bundle 4 by a motor and a worm gear. In the condition of the projection arrangement according to the invention shown in FIG. 1, the first deflecting mirror 8 is arranged in the optical path between the lamp housing 1 and the mechanical film stage 2 in such a manner that the light ray bundle 4 from the light source is deflected substantially perpendicular to the light propagation direction from the lamp housing 1 to the mechanical film stage 2. The first deflecting mirror 8 may be moved out of the optical path between the lamp housing 1 and the mechanical film stage 2 using the carriage, not shown, so that the light ray bundle 4 is not deflected, as shown in FIG. 1, but illuminates a film guided on the mechanical film stage 2. In this condition, a standard movie may be projected. However, in the condition shown in FIG. 1, the first deflecting mirror 8 is arranged in the optical path between the lamp housing 1 and the mechanical film stage 2, as shown in FIG. 1, using said carriage. The light ray bundle 4 deflected by the first deflecting mirror 8 is incident on a second deflecting mirror 9 of the deflecting unit 6 and is deflected by said second deflecting mirror 9 by about 90° in such a manner that the light ray bundle deflected by the second deflecting mirror 9 is preferably propagated parallel to the light ray bundle 4 exiting from the lamp housing 1.

As an alternative to the carriage, there may also be provided a swivel device by which the deflecting mirror 8 may be swivelled from the position shown in FIG. 1 into a position wherein the light ray bundle 4 is no longer deflected, but is directed to the film stage 2.

For this mechanical movement of the deflecting mirror 8 into and out of the optical path of the light ray bundle 4, it is advantageous to provide mechanically self-locking locking devices, by which the deflecting mirror 8 is locked in the extended and in the retracted state, respectively. This allows the drive system of the carriage or of the swivel device to be deenergized when the deflecting mirror 8 is in the retracted or extended state. To this end, the locking devices may further be provided with limit switches, which emit a signal when the deflecting mirror 8 is in the desired retracted or extended state. This allows automatic switching using the deflecting unit 6.

Figure 2:
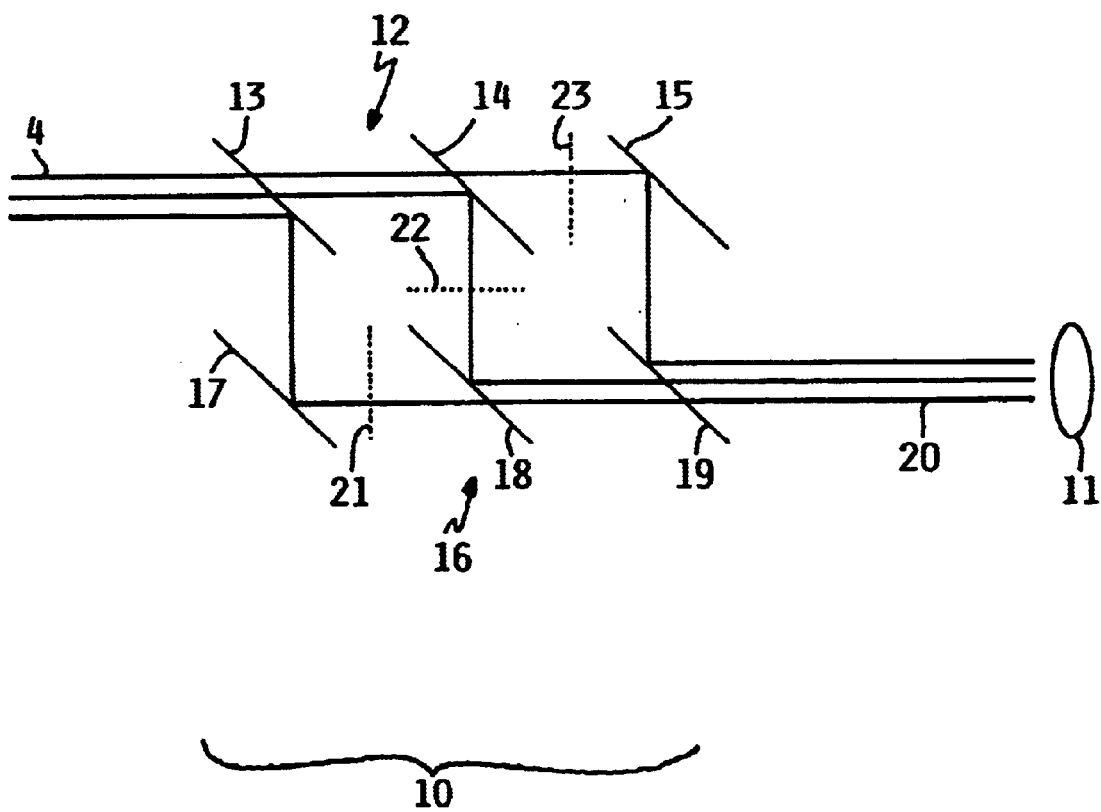
FIG. 2 shows a top view of a light modulator according to an embodiment.

The image generating module 7 is arranged such that the light ray bundle deflected by the second deflecting mirror 9 is incident on the image generating module 7. As shown in FIG. 2, the image generating module 7 comprises a light modulator 10 and projection optics 11. The light modulator 10 is controlled on the basis of predetermined image data in such a manner that it generates an image which consists of image pixels, said image being projected by means of the projection optics 11. Further, there may also be provided a light integrator or a light mixing rod (not shown), which precedes the light modulator 10 and transforms the light ray bundle 4 in such a manner that the light-modulating units 21, 22, 23 described below are illuminated as uniformly as possible. The light modulator 10 comprises a color-splitting unit 12 having three mirrors 13, 14 and 15, which are arranged successively along a first optical axis, each of said mirrors being tilted at 45° relative to said first optical axis. The mirror 13 disposed on the inlet side is a mirror which only reflects the blue component of the white light of the light ray bundle. The remaining color components of the light pass through the mirror 13 and are incident on the next mirror 14, which only reflects the green color component thereof. The red light component passing through this mirror 14 is then reflected by the mirror 15, which selectively reflects red light.

The light modulator 10 further includes a color-combining unit 16 comprising three mirrors 17, 18 and 19. Said mirrors 17, 18 and 19 are arranged along a second optical axis, which is parallel to the first optical axis of the light bundle incident on the light modulator 10. Further, these mirrors 17, 18 and 19 are tilted at 45° relative to the second optical axis and arranged such that the blue, green and red light reflected by the mirrors 13, 14 and 15, respectively, is deflected so as to be propagated along the second optical axis. Thus, the blue, green and red light ray bundles are combined to form one common light ray bundle 20. Further, the light modulator 10 comprises three light-modulating units 21, 22 and 23 (e.g. LCD modules), each modulating one color component of the light split into blue, green and red color components, thus creating the required individual color pixels whose combination yields the desired image. In the embodiment shown in FIG. 2, the light modulation unit 21 for the blue light component is arranged between the mirrors 17 and 18. The light modulation unit 22 for the green light component is arranged between the mirrors 14 and 18, and the light modulation unit 23 for the red light component is arranged between the mirrors 14 and 15. The modulation using the light-modulating units 21, 22 and 23 is carried out according to the digital and/or analog data present. The light ray bundle 20, which is color-modulated, is then projected onto the screen (not shown) by the projection optics 11. The mirrors 13, 14, 15 and 21, 22, 23 may be in the form of dichroic mirrors.

Figure 3:
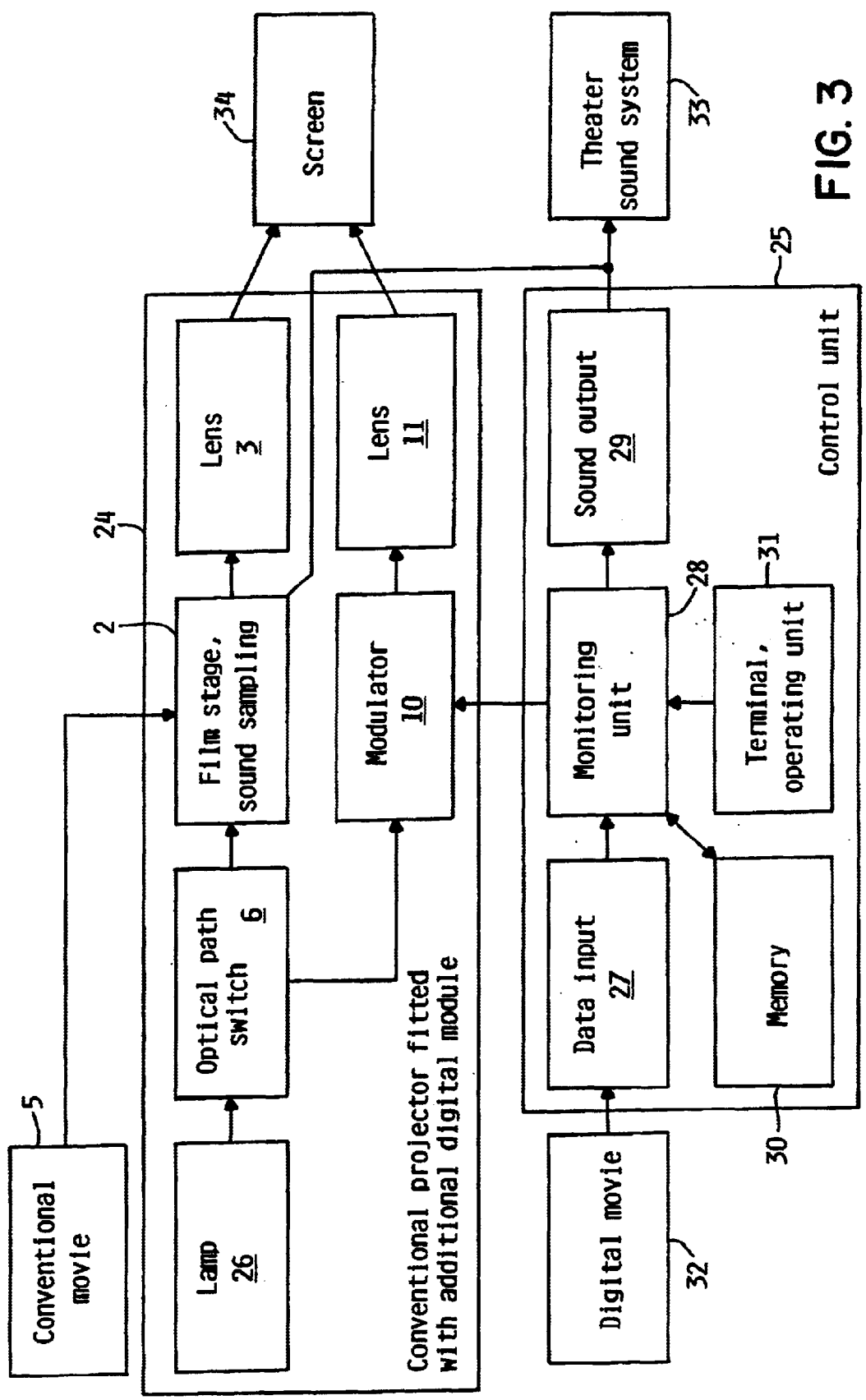
FIG. 3 shows a block diagram of the projection arrangement according to the invention.
Figure 8:
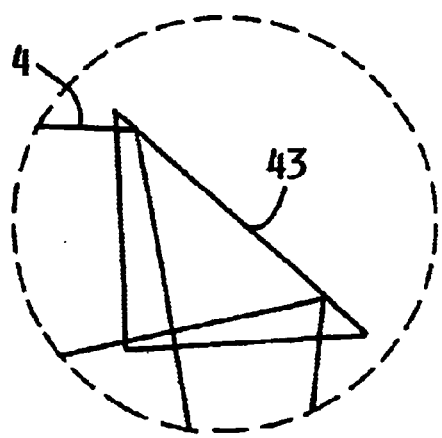
FIG. 8 shows a schematic view explaining an alternative embodiment of the deflecting unit.

FIG. 3 shows a block diagram of the projection arrangement according to the invention. As is evident from FIG. 3, the projection arrangement according to the invention comprises a projection unit 24 and a control unit 25. The projection unit 24 includes the light modulator 10, the projection optics 11, the lamp 26 arranged in the lamp housing 1, the deflecting unit 6, the mechanical film stage 2 and the projection lens 3. The film 5 is fed to the mechanical film stage 2. The control unit 25 comprises a data input 27, a monitoring unit 28, a sound output 29, a memory 30, an operating unit 31, which includes an input unit, e.g. a keyboard, and a display device, e.g. a monitor, and further comprises an output interface (not shown), by which, e.g., the dimming of the auditorium lighting or the movement of a curtain away from the projection surface may be controlled. The control unit 25 may be provided as a separate unit, which may be set up separately from the projection unit 24, e.g. in a different room.

Various data links may be used to transmit the data from the control unit 25 to the projection unit 24. It is essential that the bandwidth be sufficient for data transmission. For example, the LVDS system (Low Voltage Differential Signaling System, of the National Semiconductor company) or the PanelLink system of the Silicon Image company, which allow transmission of large data volumes via a cable having only two wires, are advantageous.

The movie 32 consisting of stored image data is fed to the control unit 25 via the data input 27. Said data input 27 may be, on the one hand, an interface to an external network, e.g. the internet. On the other hand, said data input 27 may also be realized by a drive receiving a storage medium, such as a DVD drive. The data entered via the data input 27 may either be written to the memory 30 by the monitoring unit 28 or used directly to control the light modulator 10 in the projection unit 24. Further, the monitoring unit 28 may also filter out sound data from the input data and apply them to a theater sound system 33, synchronously with the image data, via the sound output 29. The control unit 25 may also be used to control the position of the first deflecting mirror 8 (see FIG. 1), i.e. the first deflecting mirror 8 may be arranged either in the optical path between the lamp housing 1 and the mechanical film stage 2, as shown in FIG. 1, or outside said optical path.

The monitoring unit 28 may further use the image data either unmodified to control the light modulator 10, or may perform an adjustment of format or resolution or any other desired graphical transformation, said adjustment or transformation being realizable both by hardware and by software.

Further, the monitoring unit 28 allows to compensate distortions caused by the projection optics 11. These may be, for example, pin-cushion or barrel distortions. To this end, the image data for controlling the light modulator 10 are pre-distorted by the monitoring unit 28 in such a manner that said pre-distortion is compensated by the distortion caused by the projection optics 11, so that an image exhibiting as little distortion as possible is projected on the screen 34. If desired, the monitoring unit 28 also allows to perform color adjustments and color conversions.

The above-described data processing operations may be carried out either during projection or may be performed in advance, with the processed data then being stored in the memory 30.

Also, using the monitoring unit 28, an entire movie program may be composed in advance via the operating unit 31. Thus, advertisements and theatrical trailers preceding the actual movie may easily be compiled, and it is also possible, for example, to compile different advertisements for the children's program and for the evening program. Thus, the movie program for each screening may be compiled in advance and then started by one single input via the operating unit 31. Since the control unit 25 may be set up in a different room than the projection unit 24, it is possible, for example, to set up the control unit 25 next to the person who is also selling the movie tickets. Thus, said person may sell the tickets as well as start and end the screening of the movie.

Advantageously, the projection arrangement according to the invention may also comprise a camera (not shown), which is installed in the auditorium and records the image projected onto the screen 34 and transmits it to the control unit 25, which displays the transmitted image on the monitor of the operating unit 31. This allows to monitor that the screening of the movie is effected correctly and, if necessary, to take action immediately.

If a movie is to be projected using the image generating module 7, this may be entered via the operating unit 31 of the projection arrangement according to the invention. Thereupon, the monitoring unit 28 will first check whether the first deflecting mirror 8 is in the position shown in FIG. 1. Should it not be in said position, the swivel device will be controlled such that the first deflecting mirror 8 is swivelled to the position shown in FIG. 1. Then, the screening of the selected movie, including the advertisements and theatrical trailers optionally determined in advance for said film, is automatically started. If a conventional positive film is to be screened, this may be entered via the operating unit 31. The monitoring unit 28 will then check whether the first deflecting mirror 8 is in the position shown in FIG. 1. If it is in said position, the monitoring unit 28 will control the swivel device such that the first deflecting mirror 8 is swivelled out of the optical path between the lamp housing 1 and the mechanical film stage 2. Then, the screening of the positive film including the sound transmission is effected in the conventional manner.

The projection arrangement according to the invention may also be employed such that, during the projection of a movie using the image generating module 7, switching may be effected to the projection of said movie using the transillumination method. This is advantageous, for example, if problems occur during the projection using the image generating module 7. In order to realize this, the movie must be present both as a conventional positive film and in the form of image data for the image generating module 7. Further, to this end, the projection arrangement must be configured such that the deflecting unit 6 deflects the light ray bundle 4 between the lamp housing 1 and the mechanical film stage 2. Moreover, the monitoring unit 28 is provided such that it monitors the projection using the image generating module 7 by simple sensory equipment or by a control software, which controls, for example, the data flow from the memory 30 or the data input 27. Now, the projection is controlled such that, during the projection using the image generating module 7, the positive film also runs synchronously or with a slight delay. If the monitoring unit 28, now, detects problems occurring during the projection using the image generating module 7, the optical path switch 6 is directly controlled so that now the positive film can be projected. If both movies are running synchronously, it is even possible to use either the sound or only the image of the positive film, so that the other information is present in high, preferably digital, quality, during a limited failure of the system.

The image generating module 7, the deflecting unit 6 and the projection optics 11 may be provided as a projection module which can be coupled to and uncoupled from a conventional projector, such as that shown, for example, in FIG. 14. Being provided as a separate, portable projection module, this projection module may be coupled, for example, to the projector as required. It is also possible to acquire such a projection module for several projectors and to couple the projection module to the desired projector in each case.

In order to allow easy coupling of the projection module to said conventional projectors, there is preferably provided a support, which consists of a first coupling device provided on the respective projector and a second coupling device provided on the projection module. The first coupling device is disposed in a defined spatial relationship to the conventional projector. Preferably, it is attached to the foot of the lamp housing 1 of the projector and comprises a base having a self-centering three-point support, on which the projection module may be placed. The self-centering three-point support comprises, for example, three conical sleeves, in which corresponding counterparts of the projection module engage when the projection module is rested thereon. Said conical sleeves may be individually adjusted in their position perpendicular to the plane of the supporting surface and may be adjusted together in the plane of the supporting surface. Thus, the support has a means of adjustment, which is provided in the first coupling device remaining on the projector so that the projection module merely needs to be placed on the three-point support and is then immediately ready for operation.

Advantageously, the support may further comprise a data and current interface, which comprises a first plug element provided on the first coupling device and a second plug element provided on the second coupling device. Said plug elements are arranged such that, when the projection module is placed on the three-point support, a mechanical and electrical contact is established. To this end, one of said plug elements may be floatingly mounted, while the other of said plug elements has a fixed position.

If the support, as described above, is provided with a data interface, a corresponding supply line is provided for each conventional projector. This allows to provide just one single control unit 25 for all of the conventional projectors, so that the projection module and the control unit 25 are provided as separate units. On the one hand, this increases the transportability of the projection module. On the other hand, the control unit may be arranged at any desired location, so that there is no interference with the space in the projection booth in which the conventional projector is located.

Alternatively, the projection module may comprise the control unit 25. In this case, the projection module is an operable, transportable unit.

FIGS. 4 and 5 show an alternative embodiment of the light modulator 10. In this embodiment, three prisms 35, 36 and 37 are arranged and provided such that, in the first prism 35, blue light from the light ray bundle deflected by the second deflecting mirror 9 is filtered out by reflection and directed to a tilting mirror matrix 38. Of the remaining light bundle, only the red light is filtered out by reflection in the second prism 36 and directed to a tilting mirror matrix 39. The remaining light, namely the green component, is directed to a tilting mirror matrix 40 by a third prism 37. The individual color components are suitably modulated and reflected back by the tilting mirror matrices 38, 39 and 40 according to the image data so that they are combined to form one common light ray bundle 20, which is projected onto the screen via the projection optics 11. FIG. 5 schematically shows that the individual mirrors may be tilted such that the imaging light is reflected back to the projection optics (solid line) or reflected back onto a diaphragm element 41 (doffed line). If the light is reflected onto the diaphragm element 41, the corresponding color pixel remains dark in the represented image. Instead of the tilting mirror matrices 38, 39 and 40, reflective LCD modules may be used as well.

The deflecting unit 6 may also be configured such that a rotatable mirror is provided, which deflects the light bundle 4 to the image generating module 7 in a first position, and deflects the light bundle 4 to the mechanical film stage 2 in a second position.

In the following, alternative embodiments of the deflecting unit 6 will be described with reference to FIGS. 6 to 11, each of them showing enlarged, schematic views of an uncoupling location, which is situated in the optical path between the lamp housing 1 and the projection lens 3. Thus, instead of the first deflecting mirror 8 of the deflecting unit 6 (FIG. 1), a rotatable mirror 42 may be arranged at a position in the optical path of the light bundle 4, said mirror deflecting the light bundle 4 in a first position (FIG. 6) and being arranged in the light bundle 4 in a second position (FIG. 7) such that only minimal shading occurs in the light bundle 4. Said shading decreases as the thickness of the mirror decreases.

Alternatively, as the deflecting element, a prism 43 (FIG. 8) may also be used, which may be moved into the optical path of the light bundle 4, for example by a controllable carriage (not shown), such that a deflection is effected by total reflection in the prism. In a second position of the prism 43, the prism is moved out of the optical path of the light bundle 4, so that no deflection occurs, and the light is incident on the film held on the film stage 2.

Figure 9:
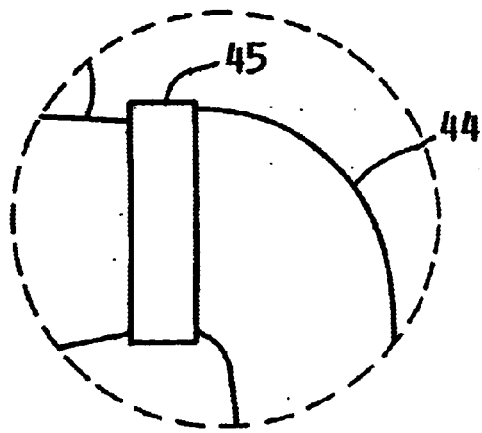
FIG. 9 shows a schematic view explaining an alternative embodiment of the deflecting unit.
Figure 10:
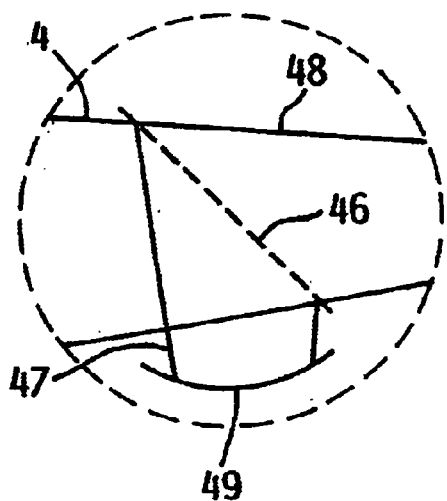
FIGS. 10 and 11 show schematic views explaining an alternative embodiment of the deflecting unit.
Figure 11:
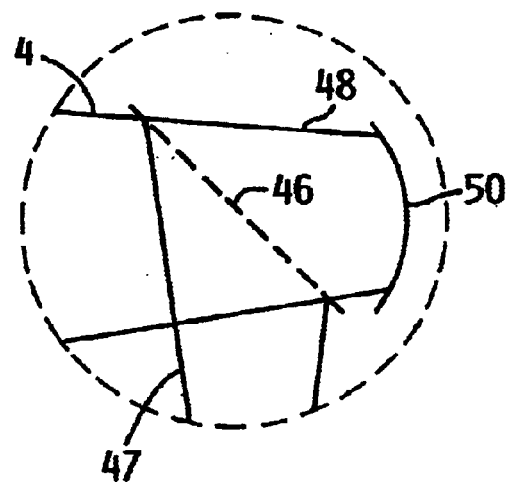

The deflecting unit 6 may also be realized by an optical waveguide 44 (which may be either flexible or rigid), whose end portion 45 is movable into the optical path of the light bundle 4 for uncoupling (FIG. 9). The optical waveguide 44 may be used simultaneously as a light integrator for the image generating module, so that, at the end of the optical waveguide 44 facing the image generating module 7, an image field is present, which is as uniformly illuminated as possible and adapted to the light modulators. The optical waveguide 44 may be provided such that there is a change in cross-section between the beam cross-section incident on the optical waveguide and the beam cross-section exiting therefrom.

The deflecting unit 6 may also comprise a beam-splitting mirror 46, which splits the light bundle 4 into two light bundles 47, 48 extending orthogonally to each other, and shutters or diaphragms 49, 50, by which one each of said split light bundles 47, 48 is shaded. The beam-splitting mirror 46 is indicated by a broken line in FIGS. 10 and 11. In the condition shown in FIG. 10, the light bundle 47 is shaded, while in the condition shown in FIG. 11, the light bundle 48 is shaded. The shutters 49, 50 may be moved, e.g. magnetically or piezomechanically, in order to selectively shade the light bundles 47, 48. The beam-splitting using said mirror may also be realized by a beam-splitting prism.

The deflecting unit 6 may also be realized by electronically switchable elements, so that no mechanical movement of components for switching the optical path is required. In this embodiment, for example, the light bundle 4 is polarized. This may be realized either by a light source, which emits polarized light, or by a polarizer, through which a non-polarized light bundle passes. The light bundle polarized in this manner then passes through an electronically controllable element using which the polarization direction of the light bundle may be rotated. Such an element may be, for example, an LCD module or a Faraday modulator. Arranged following said element is a polarizing beam-splitter cube, which allows an incident light ray bundle to pass or deflects it as a function of its polarization. Thus, the deflection of the light ray bundle 4 may be controlled electronically via the control of the element by which the polarization direction can be rotated.

As has already been described, the deflecting unit 6 may be arranged between the light source 1 and the film stage 2 or between the film stage 2 and the projection lens 3.

Further, it is also possible to arrange the lamp housing 1 displaceably so that the light bundle 4 arrives at the film stage 2 in a first position of the lamp housing 1 and arrives at the image generating module 7 in a second position of the lamp housing 1. Preferably, said displacement is effected transversely to the direction in which the light bundle 4 exits. Alternatively, the lamp housing may be fixed, and the mechanical film stage 2 and the image generating module 7 may be arranged to be displaced together in such a manner that the light bundle 4 is directed to the film stage 2 in a first position of the film stage 2 and of the image generating module 7, and that the light bundle 4 is directed to the image generating module 7 in a second position of the film stage 2 and of the image generating module 7. In a further embodiment, it is possible to move the image generating module 7 into an optical path extending from the light source 26 to the projection surface 34 via the film stage 2. In this case, the image generating module 7 may preferably be realized by a transmission LCD module.

In a further embodiment of the invention, the projection optics 11 of the image generating module 7 are provided such that an intermediate image of the modulated image is generated in such a manner that the projection lens 3 may be used for both projection of the positive film and projection using the image generating module 7.

As the light modulator 10, a GLV module 51 may also be employed. FIGS. 12 and 13 schematically show the operation of such GLV module 51 (a switchable diffracting reflection grating), which may be employed, for example, in the light modulator shown in FIGS. 4 and 5 instead of the tilting mirror matrices 38, 39, 40 used therein. The GLV module 51 comprises several parallel reflecting strips 52 for each image pixel which are alternatingly fixed in their position and positioned moveable in height. In a first adjustable position of the strips 52, all of said strips 52 are situated in one plane, so that the light incident on the strips 52 via a deflecting element 53 is reflected back (FIG. 12). In a second position of the strips 52, shown in FIG. 13, every other strip 52 is offset in height relative to the other strips 52 so that the strips 52 form a reflecting diffraction grating. Due to said diffraction, a large part of the incident light is not reflected back again to the deflecting mirror 53. Thus, the intensity of the light reflected back by the deflecting mirror 52 is substantially lower than in FIG. 12. This allows to realize brightness/darkness control of the image pixel. Thus, it is essential for this GLV module 51 that the angle of the light reflected by this module be modifiable as described above and that, depending on said angle, the reflected light be used either to generate a bright image pixel or be directed to a beam trap and thus darkened. It depends essentially on the construction of the light modulator whether the reflected light (FIG. 12) or the diffracted light (FIG. 13) is used for a brightened image pixel. The GLV module 51 may be present as a matrix arrangement so that the image pixels are arranged in lines and columns. Alternatively, the GLV module 51 may be realized as a linear arrangement of image points. In this case, scanning of the image line or image column is then required for imaging. This may be realized by known scanning devices arranged following the light modulator 10.

Referring to FIG. 15 an attachable module 100 includes light modulator 10, optical device 11 and control device 6. Control device 6 may include a moving device 102 whereby light source 104 is moveable between two positions. In a first position, light source 104 is incident on light modulator 10. In a second position, light source 104 is incident on light modulator 10. In a second position, light source 104 is incident on the film stage 2. This arrangement is depicted in FIG. 18.

In another embodiment of the invention, as shown in FIG. 17 control device 6 includes a moving device 106 that also connects light modulator 10 to film stage 2. Referring to FIG. 17, moving device 106 shifts light modulator 10 and film stage 2 as a unit between a first position in which light from the light source 104 is incident on the light modulator to a second position in which light from light source 104 is incident on the film stage 2.

Referring to FIG. 16, the invention may also be practiced as a supplementary module 108. Referring to FIG. 19, in this embodiment, a first coupling member 110 is secured to the lamp housing one of the projector. A second coupling member 112 is secured to the supplementary module 108. The supplementary module includes second coupling member 112, control device 6, light modulator 10 and optical device 11. Desirably optical device 11 is some form of projection optics for projecting the image created by light modulator 10.

Referring again to FIG. 10, another embodiment of the invention may include an image recording device 114. Image recording 114 typically includes a video camera or other image recording device that would allow monitoring of the projected image by a person in a location remote from the auditorium or other area in which the projected image is being displayed.

What is claimed is:

1. A projection arrangement for projecting an image onto a projection surface, said arrangement comprising a light source, a control unit, a selectably attachable module, the attachable module comprising a light modulator, which is controllable by said control unit in order to generate an image on the basis of predetermined image data, an optical projection device, arranged following said light modulator, for projecting said image onto the projection surface and a control device, the projection arrangement further comprising a film stage for holding a sequential series of positive images recorded on a carrier medium, projection optics, arranged following the film stage when projecting the positive images, and wherein the control device, allows light to either be directed from the light source to the light modulator or to illuminate the positive images, which are held by the film stage, and wherein the projection arrangement is adapted to project moving images from both the carrier medium and the light modulator.

2. The projection arrangement as claimed in claim 1, wherein the control device comprises an optical deflecting device, which is movable into the optical path between the light source and the film stage or between the film stage and the projection optics, in order to direct the light from the light source to the light modulator.

3. The projection arrangement as claimed in claim 1, wherein the light modulator is movable into an optical path extending from the light source via the film stage to the projection surface.

4. The projection arrangement as claimed in claim 1, wherein the control device comprises an optical path switch arranged in the optical path between the light source and the film stage, in order to direct the light from the light source either to the film stage or to the light modulator.

5. The projection arrangement as claimed in claim 1, wherein the control device comprises an optical path switch, which is arranged following the film stage and directs the light either to the light modulator or to the projection optics.

6. The projection arrangement as claimed in claim 4, wherein the optical path switch comprises a partially reflective mirror, which splits the light from the light source into two partial beams, and a diaphragm element, by which one of said partial beams may be selectively shaded.

7. The projection arrangement as claimed in claim 5, wherein the optical path switch comprises a partially reflective mirror, which splits the light from the light source into two partial beams, and a diaphragm element, by which one of said partial beams may be selectively shaded.

8. The projection arrangement as claimed in claim 1, wherein the control device comprises a moving device by which the light source is movable from a first position, in which the light is incident on the light modulator, to a second position, in which the light is incident on the film stage.

9. The projection arrangement as claimed in claim 1, wherein the control device comprises a moving device by which the light modulator is movable together with the film stage from a first position, in which the light is incident on the light modulator, to a second position, in which the light is incident on the film stage.

10. The projection arrangement as claimed in claim 1, wherein a splitting device is provided, which splits the light from the light source into different color components, and the light modulator comprises several light-modulating units, each of which modulates one of said color components.

11. The projection arrangement as claimed in claim 10, wherein a combining device is provided which combines the light emitted by the light-modulating units to form one single light bundle and guides said light bundle to the optical device.

12. The projection arrangement as claimed in claim 1, wherein the light modulator comprises an LCD module, a tilting mirror matrix or a GLV module.

13. The projection arrangement as claimed in claim 1, wherein the projection optics and the optical device are realized as one single projection unit.

14. The projection arrangement as claimed in claim 1, wherein a memory for storing data and an input interface for receiving data as well as an output interface are provided.

15. The projection arrangement as claimed in claim 14, wherein a sound unit is provided which can extract sound data from said data and feed them into a sound system via the output interface.

16. The projection arrangement as claimed in claim 1, wherein a display device and an image recording device are provided, said image recording device being able to record the image projected onto the projection surface and to represent it on the display device.

17. A projection arrangement for projecting moving images onto a projection surface, which arrangement comprises several projection units, each comprising a light source; a film stage, arranged following said light source, for holding a sequential series of positive images recorded on a carrier medium; projection optics, arranged following the film stage when projecting the positive images; and a first coupling member; said projection arrangement further comprising a control unit; a supplementary module comprising a light modulator which is controllable by the control unit in order to generate an image on the basis of predetermined image data; an optical device, arranged following the light modulator, for projecting said image onto the projection surface; and a second coupling member cooperating with said first coupling member, wherein the supplementary module may be coupled to the projection units via said coupling members, and wherein said supplementary module further comprises a control device, allowing light to either be directed from the light source of the projection unit, to which the supplementary module is coupled, to the light modulator or to illuminate the sequential series of positive images, which are held by the film stage, with said light.

18. A supplementary module for use in a motion picture projection arrangement, the supplementary module comprising a control unit, a light modulator, which is controllable by said control unit in order to generate an image on the basis of predetermined image data, an optical device, arranged following the light modulator, for projecting said image onto a projection surface, and a control device, which device, when the supplementary module is in a condition coupled to a projector comprising a light source and a film stage, arranged following said light source, for holding a sequential series of positive images recorded on a carrier medium, allows light either to be directed from the light source to the light modulator or to illuminate a positive image, which is held by the film stage, with said light.

19. A supplementary module for use in cooperation with several motion picture projection arrangements, the supplementary module comprising a control unit, a light modulator, which is controllable by said control unit in order to generate an image on the basis of predetermined image data, an optical device, arranged following the light modulator, for projecting said image onto a projection surface, and a control device, which device, when the supplementary module is in a condition coupled to a projector comprising a light source and a film stage, arranged following said light source, for holding a positive image recorded on a carrier medium, allows light to be directed from the light source to the light modulator or to illuminate a positive image, which is held by the film stage, with said light.

* * * * *